(12) United States Patent
Modan et al.

(10) Patent No.: US 9,661,577 B2
(45) Date of Patent: May 23, 2017

(54) POWER MANAGEMENT MODULE AND METHOD THEREFOR

(71) Applicants: Amir David Modan, Omer (IL); Ron-Michael Bar, Ramat-Hasharon (IL); Eran Glickman, Rishon le Zion (IL)

(72) Inventors: Amir David Modan, Omer (IL); Ron-Michael Bar, Ramat-Hasharon (IL); Eran Glickman, Rishon le Zion (IL)

(73) Assignee: NXP USA, INC., Austin, TX (US)

( * ) Notice: Subject to any disclaimer, the term of this patent is extended or adjusted under 35 U.S.C. 154(b) by 125 days.

(21) Appl. No.: 14/505,538

(22) Filed: Oct. 3, 2014

(65) Prior Publication Data
US 2016/0100367 A1    Apr. 7, 2016

(51) Int. Cl.
*G08C 17/00* (2006.01)
*H04W 52/02* (2009.01)

(52) U.S. Cl.
CPC ..... *H04W 52/0258* (2013.01); *H04W 52/028* (2013.01); *H04W 52/0235* (2013.01); *Y02B 60/50* (2013.01)

(58) Field of Classification Search
CPC ............ H04W 52/0209–52/0235; H04W 52/0261–52/0296
USPC ........................................ 370/311
See application file for complete search history.

(56) References Cited

U.S. PATENT DOCUMENTS

| | | | |
|---|---|---|---|
| 4,980,836 A | 12/1990 | Carter et al. | |
| 8,090,963 B2 | 1/2012 | Adams et al. | |
| 2003/0039214 A1* | 2/2003 | Huffman | H04W 24/00 370/252 |
| 2011/0183727 A1* | 7/2011 | Kato | H04W 52/0293 455/574 |
| 2012/0188885 A1 | 7/2012 | Tazebay et al. | |
| 2014/0064168 A1* | 3/2014 | Horiguchi | H04W 52/0229 370/311 |
| 2017/0041875 A1* | 2/2017 | Lu | H04W 76/043 |

* cited by examiner

*Primary Examiner* — Andrew Chriss
*Assistant Examiner* — Kenan Cehic

(57) ABSTRACT

A power management module comprising a client monitoring component arranged to monitor idle periods for a client component, and derive at least one idle period characteristic value for the client component based at least partly on the monitoring of the idle periods therefore. The power management module further comprises a power mode control component arranged to receive an indication of the client component entering an idle state, cause the client component to be put into a reduced power mode upon expiry of a first period of time, and cause the client component to be brought out of the reduced power mode upon expiry of a second period of time. At least one of the first and second periods of time is configured based at least partly on the idle period characteristic value(s) derived by the client monitoring component for the client component.

9 Claims, 5 Drawing Sheets

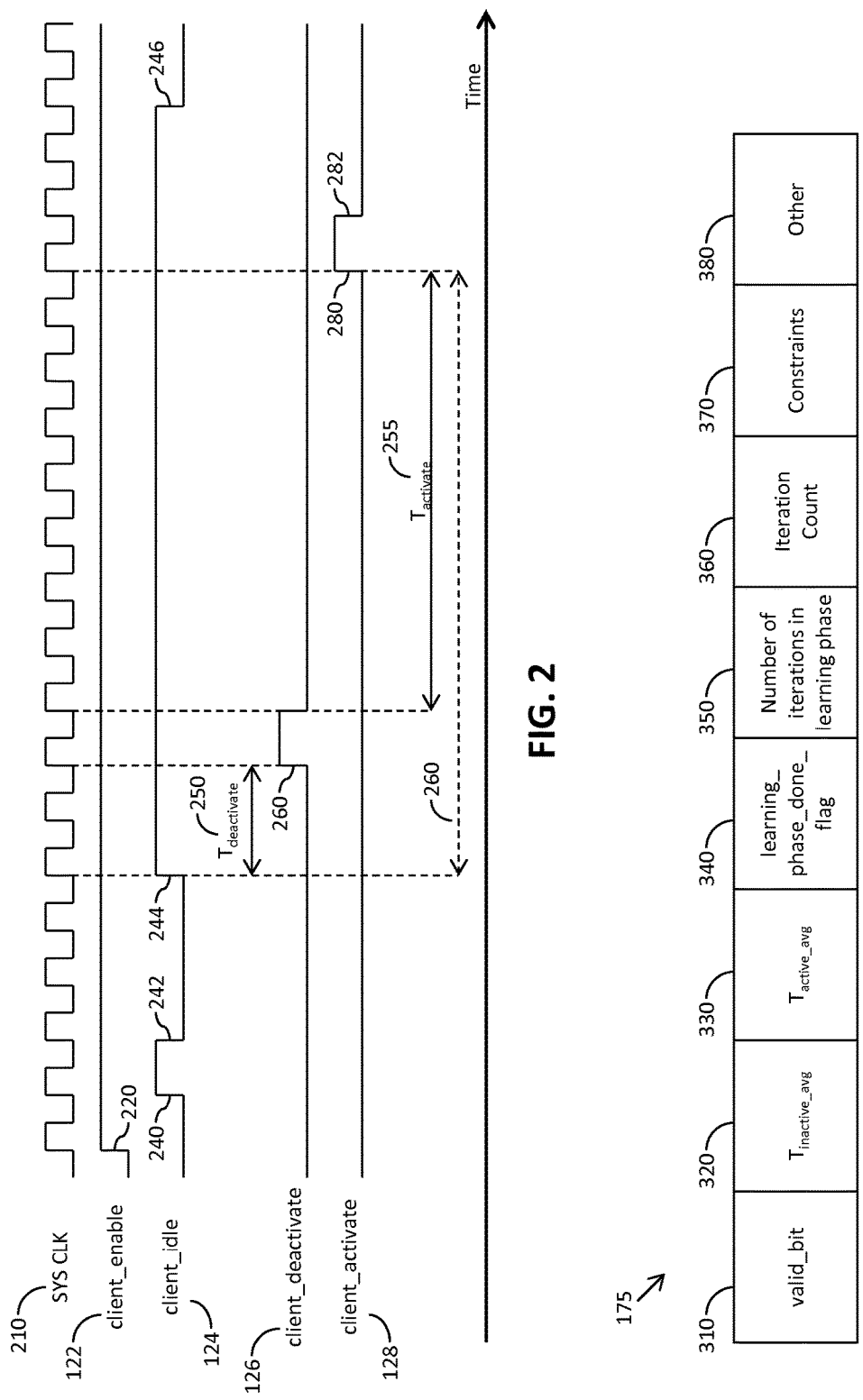

POWER MANAGEMENT MODULE AND METHOD THEREFOR

FIELD OF THE INVENTION

This invention relates to a power management module and a method therefore.

BACKGROUND OF THE INVENTION

The power used by a CMOS integrated circuit comprises two main components: static power and dynamic power. Static power essentially consists of the power used when transistors are not in the process of switching. Static power consumption has been an increasing challenge for the semiconductor industry in recent years, with the increasing demand for longer life and a trend towards more environmentally friendly applications, combined with advances in manufacturing technology and miniaturization of components that has led to decreases in gate oxide thicknesses resulting in larger leakage currents.

A common technique used presently for reducing static power consumption is the powering down of internal components inside a semiconductor device when not required/used based on various algorithms typically implemented within upper layer software. A problem faced by these algorithms is that, because they are implemented within upper layer software, they are detached from the actual hardware activity, and cannot accurately predict the relevant hardware to power down. Accordingly, such algorithms are required to take a cautious approach to powering down components.

SUMMARY OF THE INVENTION

The present invention provides a power management module and a method of power management as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2 illustrates a simplified timing diagram schematically showing an example power management implementation for a client component within an integrated circuit device.

FIG. 3 schematically illustrates a simplified example of a data entry for a client component within a data management module.

DETAILED DESCRIPTION OF THE PREFERRED EMBODIMENTS

The present invention will now be described with reference to the accompanying drawings. However, it will be appreciated that the present invention is not limited to the specific examples herein described and illustrated in the accompanying drawings.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
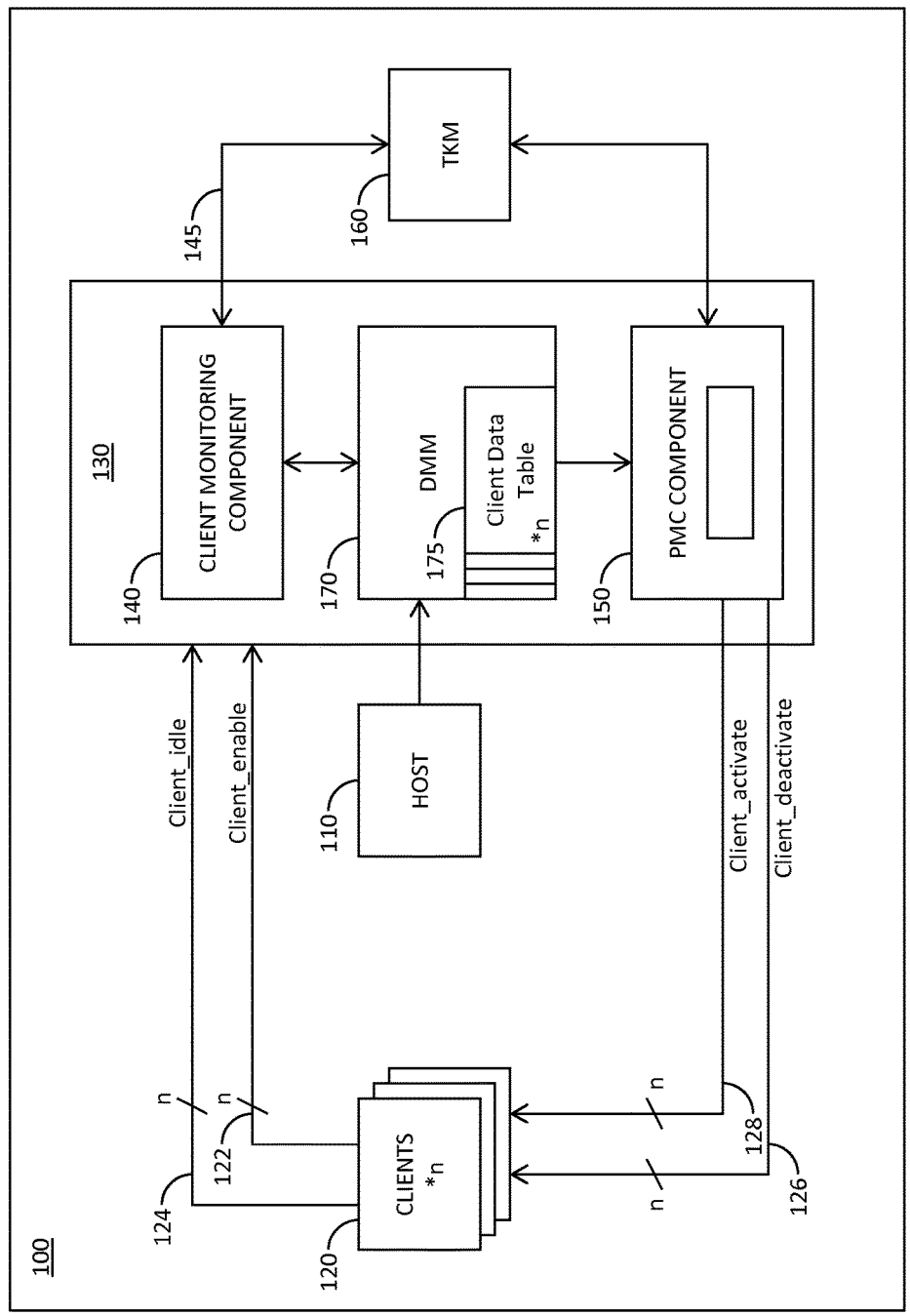
FIG. 1 illustrates a simplified block diagram of an integrated circuit device comprising a power management module.

Referring first to FIG. 1, there is illustrated a simplified block diagram of an integrated circuit device 100 comprising at least one die within a single integrated circuit package. The integrated circuit device 100 comprises various internal hardware components, such as a host processor module 110 and various client modules 120 illustrated in the example in FIG.

1. The integrated circuit device 100 further comprises a power management module 130. The power management module 130 comprises a client monitoring component 140 arranged to monitor idle periods for client components 120, and to derive idle period characteristic values for the client components 120 based on the monitoring of the idle periods therefore. The power management module 130 further comprises a power mode control component 150 arranged to receive an indication of a client component 120 entering an idle state, and upon receipt of the indication of the client component entering an idle state cause the client component 120 to be put into a reduced power mode upon expiry of a first period of time from receipt of the indication of the client component entering an idle state, and cause the client component to be brought out of the reduced power mode upon expiry of a second period of time from receipt of the indication of the client component entering an idle state. In accordance with some example embodiments of the present invention, at least one of the first and second periods of time is configured based at least partly on the idle period characteristic value(s) derived by the client monitoring component 140 for the client component 120.

Significantly, the idle period characteristic values for the client components 120 are derived based on monitoring actual idle state periods for the client components 120. In this manner, empirical idle period characteristic values may be derived for the client components 120, based on actual behaviour of the client components 120 within the specific integrated circuit device 100, for a specific application. In this manner, the timings for when a client component 120 is put into and brought out of a reduced power mode after entering an idle state may be derived from the respective empirical idle period characteristic value(s), and thus are capable of being more accurately/reliably derived than if such timings were predefined/generic. Thus, in this example of the present invention, the periods of times used to determine when a client component 120 is to put into and brought out of a reduced power mode after entering an idle state are based on a posteriori timings. This is in contrast to conventional solutions that rely on a priori timings.

In the illustrated example the power management module 130 is implemented in hardware, substantially alleviating the problem of being detached from the client components 120 suffered by conventional solutions implemented in upper level software and enabling more accurate power management to be implemented.

FIG. 2 illustrates a simplified timing diagram schematically showing an example power management implementation for a client component within an integrated circuit device, such as may be implemented within the power management module 130 illustrated in FIG. 1. A system clock signal 210 provides a reference timing signal for synchronising the various hardware components.

In the example illustrated in FIG. 1, each client component 120 is arranged to provide an enable signal 122 to the power management module 130, indicating to the power management module 130 when the respective client component 120 is enabled. Referring back to FIG. 2, the enable signal 122 for the respective client component 120 is asserted, at 220, indicating to the power management module 130 that the client component 120 is enabled from that point in time.

In the example illustrated in FIG. 1, each client component 120 is further arranged to provide an idle signal 124 to the power management module 130, indicating to the power management module 130 when the respective client component 120 is idle. Referring back to FIG. 2, the idle signal 124 for the respective client component 120 is asserted at 240, indicating to the power management module 130 that the client component 120 has entered an idle state.

As outlined above, the power mode control component 150 of the power management module 130 is arranged to receive such an indication of a client component 120 entering an idle state, and upon receipt of the indication of the client component 120 entering an idle state to initialise a first timing reference arranged to expire after a first period of time from receipt of the indication of the client component 120 entering an idle state. In the example illustrated in FIG. 1, timing references are provided by an external time keeping module 160, arranged to receive a timing reference initialisation signal 145 comprising a timing reference duration parameter, for example indicating a number of clock cycles or other timing indication. Upon receipt of such a timing reference initialisation signal 145, the time keeping module 160 may initialise a time keeping function whereby, upon expiry of a period from receipt of the timing reference initialisation signal 145 equal to the duration defined by the timing reference duration parameter, the time keeping module 160 returns an indication of the expiry of the respective timing reference. It will be appreciated that in some alternative examples, timing references may equally be provided by one or more time keeping components within the power management module 130.

Upon expiry of the first timing reference, the power mode control component 150 is arranged to cause the client component 120 to be put into a reduced power mode. However, having been asserted at 240, the idle signal 124 remains asserted for only a single clock cycle and is de-asserted at 242. As such, because the client component 120 is only in an idle state for a single clock cycle, the first timing reference expires after the client component 120 has resumed an active state, and thus the power mode control component 150 in this instance does not cause the client component 120 to be put into a reduced power mode.

In the example illustrated in FIG. 2, the idle signal 124 for the respective client component 120 is re-asserted at 244, indicating to the power management module 130 that the client component 120 has again entered an idle state. This time, the idle signal 124 remains asserted for a longer period of time. Specifically, the idle signal 124 is still asserted upon expiry of the first timing reference, as indicated generally at 250. Accordingly, upon expiry of the first timing reference, the power mode control component 150 is arranged to cause the client component 120 to be put into a reduced power mode. In the example illustrated in FIG. 1, the power mode control component 150 is arranged to cause a client component 120 to be put into a reduced power mode by asserting a respective deactivate signal 126. Thus, and as illustrated in FIG. 2, the deactivate signal 126 for the respective client component 120 is asserted at 260 by the power mode control component 150 to cause the client component 120 to be put into a reduced power mode. The deactivate signal 126 may be provided to, say, a power gating component (not shown) within the client component 120, or to some other power control component/module to implement the transition of the respective client component 120 to a reduced power mode.

As also outlined above, the power mode control component 150 of the power management module 130 is further arranged to initialise a second timing reference arranged to expire after a second period of time from receipt of the indication of the client component 120 entering an idle state, said second period of time being illustrated at 260. Upon expiry of the second timing reference, the power mode control component 150 is arranged to cause the client component 120 to be brought out of the reduced power mode. In the example illustrated in FIG. 2, said second period 260 comprises an accumulation of the first period ($T_{deactivate}$) 250, a single clock cycle and a further period ($T_{activate}$) 255, and the power mode control component 150 is arranged to initialise the second timing reference upon expiry of the first timing reference and having asserted the deactivate signal 126 at 260, with the second timing reference arranged to expire after the further period ($T_{activate}$) 255. In some alternative examples, the power mode control component 150 may alternatively be arranged to initialise the second timing reference upon receipt of the indication of the client component 120 entering an idle state, with the second timing reference arranged to expire after the second period 260.

Upon expiry of the second timing reference, the power mode control component 150 is arranged to cause the client component 120 to be brought out of the reduced power mode. In the example illustrated in FIG. 1, the power mode control component 150 is arranged to cause a client component 120 to be brought out of a reduced power mode by asserting a respective activate signal 128. Thus, and as illustrated in FIG. 2, the activate signal 128 for the respective client component 120 is asserted at 280 by the power mode control component 150 to cause the client component 120 to be brought out of the reduced power mode. The activate signal 128 may be provided to, say, a power gating component (not shown) within the client component 120, or to some other power control component/module to implement the transition of the respective client component 120 out of the reduced power mode.

Referring back to FIG. 1, as previously mentioned the client monitoring component 140 is arranged to monitor idle periods for client components 120, and to derive idle period characteristic values for the client components 120 based on the monitoring of the idle periods therefore. In some examples, the client monitoring component 140 is arranged derive client component specific idle period characteristic values for based at least partly on the monitoring of the idle periods therefore, whereby different idle period characteristic values may be derived for each client component 120. In some examples, the client monitoring component 140 is arranged to measure durations of idle periods and/or active periods for the client components 120, and to derive the idle period characteristic values for the client components 120 based at least partly on the measured durations of the idle and/or active periods therefore. Examples of idle period characteristic values that may be derived by the client monitoring component 140 comprise, by way of example only:

- a mean idle period duration for the at least one client component;
- a median idle period duration for the at least one client component;
- a mode idle period duration for the at least one client component;
- a highest idle period duration for the at least one client component;
- a lowest idle period duration for the at least one client component;
- a mean active period duration for the at least one client component;
- a median active period duration for the at least one client component;
- a mode active period duration for the at least one client component;
- a highest active period duration for the at least one client component; and
- a lowest active period duration for the at least one client component.

In the example illustrated in FIG. 1, the power management module 130 comprises a data management module 170 arranged to store data entries 175 for the client components 120, and the client monitoring component 140 is arranged to store idle period characteristic values derived thereby for the client components 120 within the data management module 170. The data entries 175 for the client components 120 may further comprise configuration data and the like for client components 120, configurable by, say, application software executing on the host processor module 110. FIG. 3 schematically illustrates a simplified example of a data entry 175 for a client component 120 within the data management module 170. In the example illustrated in FIG. 3, the data entry 175 comprises:

- a valid_bit entry 310 indicating whether power management provided by the power management module 130 is to be provided for the respective client component 120;
- idle period characteristic value entries 320, 330;
- a learning_phase_done_flag entry 340;
- an entry 350 defining the number of iterations in the learning phase;
- an iteration count entry 360;
- a constraints entry 370; and
- any other number of other required entries illustrated generally at 380.

Figure 4:
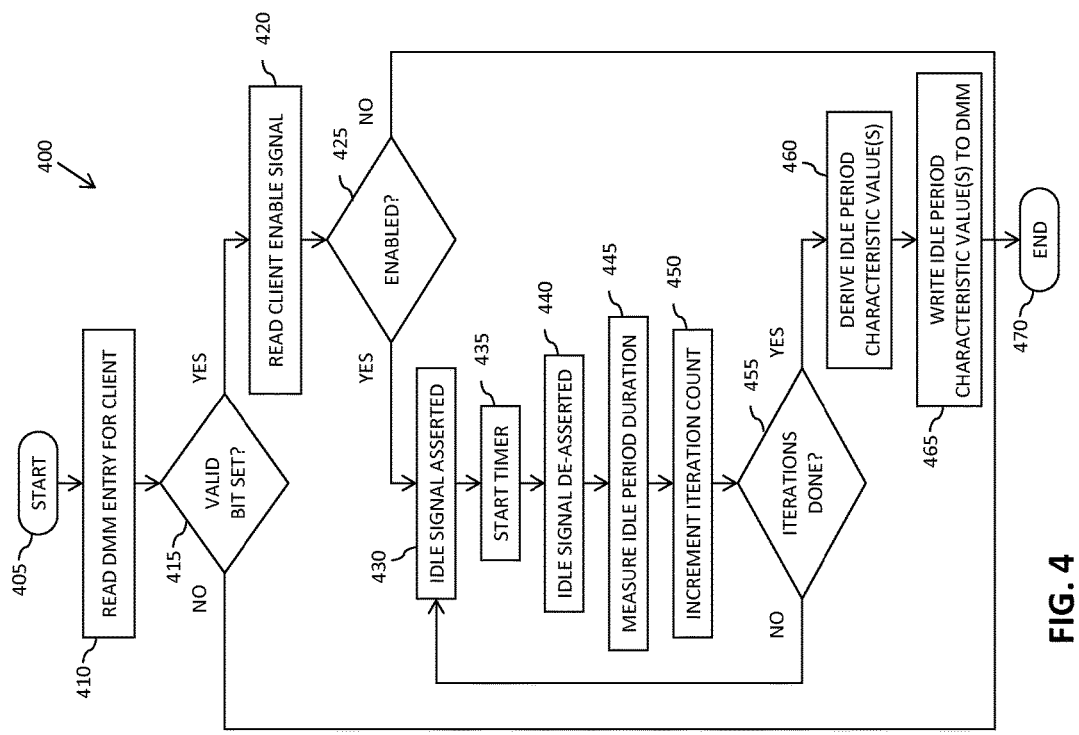
FIG. 4 illustrates a simplified flowchart of an example of a method of deriving idle period characteristic values for a client component.

FIG. 4 illustrates a simplified flowchart 400 of an example of a method of deriving idle period characteristic values for a client component 120, such as may be implemented within the client monitoring component 140 of FIG. 1. The method starts at 405, and in the illustrated example moves on to 410 where the data entry 175 for the respective client component 120 is read. Next, at 415, it is determined whether the valid_bit entry 310 within the read data entry 175 for the client component 120 is set. If the valid_bit entry 310 is not set, then the power management provided by the power management module 130 is not to be provided for the respective client component 120. Accordingly, the method moves on to 470 and ends. In this manner, legacy support etc. may be provided, enabling application software executing on the host processor module 110 to identify client components 120 for which such power management functionality may not be appropriate.

Referring back to 415, if the valid_bit entry 310 within the read data entry 175 is set, the method moves on to 420 where the enable signal 122 for the respective client component 120 is read. If the enable signal 122 is not asserted, indicating that the respective client component 120 is not enabled, the method moves on to 470 and ends. The method may subsequently be rerun until the client component 120 is found to be enabled. Referring back to 425, if the enable signal 122 is asserted, indicating that the respective client component 120 is enabled, the method moves on to 430 where, in the illustrated example, the method waits for the idle signal 124 to be asserted, indicating the respective client component 120 entering an idle state. Upon the idle signal 124 being asserted, a timer is started (for example by way of initialising a timing reference within the external time keeping module 160). The method then waits for the idle signal 124 to be de-asserted, at 440, indicating the respective client component 120 exiting the idle state. Upon the idle signal 124 being de-asserted, an idle period duration for the respective client component 120 is measured, at 445. In some examples, the measured idle period duration may be written to the data management module 170. The iteration counter 360 is then incremented, at 450, and it is determined whether the defined required number of iterations 350 has been completed, at 455. If the defined required number of iterations has not been achieved, the method loops back to 430 and waits for the next idle period. Conversely, if it is determined that the required number of iterations has been completed, the method moves on to 460, where the idle period characteristic value(s) for the client component 120 are derived based on the measured idle period durations. The derived the idle period characteristic value(s) are then written to the data management module 170, at 465, and the method ends at 470.

In some examples of the present invention, the idle period characteristic value(s) may be derived from on all measurements obtained from first initialisation of the system, or alternatively may derived from, say, the most recent n measurement values, or only measurement values obtained with a limited interval (e.g. the last day/month/year etc.). In some examples, a user or software executing on the host processor 110 may be able to configure such a time interval Referring back to FIG. 1, as previously mentioned at least one of the first and second periods of time defining when a client component 120 is put into and brought out of a reduced power mode after entering an idle state is configured based at least partly on the idle period characteristic value(s) derived by the client monitoring component 140 for the client component 120, and in some examples both the first and second periods of time may be configured based at least partly on the idle period characteristic value(s) derived by the client monitoring component 140. In some examples, the power mode control component 150 may be arranged to derive the first and second periods of time defining when a client component 120 is put into and brought out of a reduced power mode after entering an idle state for the respective client component 120. For example, the power mode control component 150 may be arranged to read the idle period characteristic value(s) for the respective client component 120 from the data management module 170 and derive timing reference duration parameters 250, 255 therefrom for configuring the timing references to expire after the required first and second periods of time for the respective client control component 120.

In some examples, periods of time defining when a client component 120 is put into and brought out of a reduced power mode after entering an idle state may be derived by using one or more statistical sampling algorithms. Such statistical algorithm(s) may be used can be configured by the host 110 or preconfigured, with the data management module 170 being arranged to manage and calculate the statistical characteristics according to the configured algorithm(s).

It is contemplated that any suitable algorithm may be used to derive the periods of time defining when a client component 120 is put into and brought out of a reduced power mode after entering an idle state may. Examples of such an algorithm include, but are not limited to, a "moving average" or "moving median" algorithm, a moving median algorithm, etc. In the case of a moving median algorithm, the host 110 may configure the constraint 370 in the data entries 175 to comprise a value defining the size of the series for which the median calculation will be performed.

Figure 5:
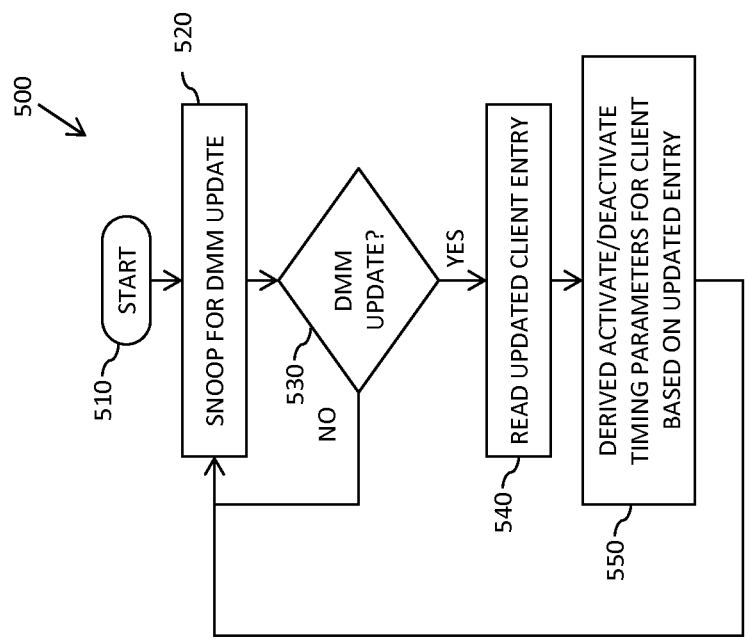
FIG. 5 illustrates a simplified flowchart of an example of a method for configuring first and second periods of time defining when a client component is put into and brought out of a reduced power mode after entering an idle state.

FIG. 5 illustrates a simplified flowchart 500 of an example of a method for configuring the first and second periods of time defining when a client component 120 is put into and brought out of a reduced power mode after entering an idle state, such as may be implemented within the power mode control component 150. The method starts at 510, and moves on to 520 where in the illustrated example the method snoops for an update within the data management module 170 to determine whether the idle period characteristic value(s) for a client component 120 has/have been updated. If it is determined that no update has taken place, the method loops back to 520 and the method continues to snoop for an update. If it is determined that an update has taken place at 530, the method moves on to 540 where the updated client component entry is read. Timing parameters for the respective client component 120 to configure the first and second periods of time defining when a client component 120 is put into and brought out of a reduced power mode after entering an idle state are then derived at 550 based on the updated idle period characteristic value(s). The method then loops back to 520.

As previously mentioned above, and described with reference to FIG. 2, the power mode control component 150 is arranged to receive an indication of a client component 120 entering an idle state, and upon receipt of the indication of the client component entering an idle state to initialise a first timing reference arranged to expire after a first period of time from receipt of the indication of the client component 120 entering an idle state. Upon expiry of the first timing reference, the power mode control component 150 is arranged to cause the client component 120 to be put into a reduced power mode. Furthermore, the power mode control component 150 is arranged to initialise a second timing reference arranged to expire after a second period of time from receipt of the indication of the client component 120 entering an idle state. Upon expiry of the second timing reference, the power mode control component 150 is arranged to cause the client component 120 to be brought out of the reduced power mode.

Figure 6:
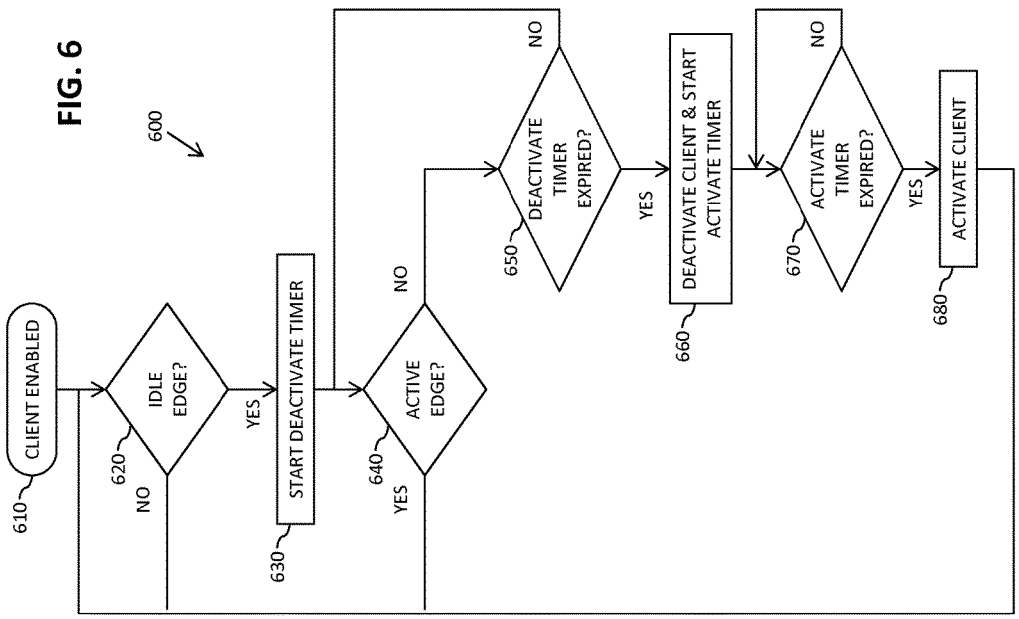
FIG. 6 illustrates a simplified flowchart of an example of the management of a power mode for a client component.

FIG. 6 illustrates a simplified flowchart 600 of an example of the management of a power mode for a client component 120, such as may be implemented within the power mode control component 150 of FIG. 1. The method starts at 610 with detecting that the client component 120 has been enabled, for example by way of the respective enable signal 122 being asserted. The method then loops until an indication of the client component 120 entering an idle state is received, at 620, for example by way of the idle signal 124 being asserted. Upon an indication of the client component 120 entering an idle state being received, the method moves on to 620 where a first timing reference is initialised at 640, the first timing reference being arranged to expire after a first period of time from receipt of the indication of the client component 120 entering an idle state. The method then loops until an indication of the client component 120 exiting the idle state is received, at 640, for example by way of the idle signal 124 being de-asserted, or until the first timing reference expires, at 650. If an indication of the client component 120 exiting the idle state is received, the method loops back to 620. Conversely, if the first timing reference expires, at 650, the method moves on to 660, where the client component 120 is caused to be put into a reduced power mode, for example by way of asserting the respective deactivate signal 126, and a second timing reference is initialised, the second timing reference being arranged to expire after a second period of time from receipt of the indication of the client component 120 entering an idle state. The method then loops until the second timing reference expires, at 670. Upon expiry of the second timing reference, the method moves on to 680 where the client component 120 is caused to be brought out of the reduced power mode, for example by way of de-asserting the respective deactivate signal 126. The method then loops back to 620.

Thus, an example of a hardware power management solution capable of receiving user configuration that defines the attributes which influence the timings for when a client component 120 is put into and brought out of a reduced power mode after entering an idle state has been herein before described and illustrated in the accompanying drawings. Furthermore, the power management module 130 herein described and illustrated in the accompanying drawings is arranged to autonomously learn and adapt such timings on a per client components basis. In this manner, the power management module 130 is able to autonomously power down and up components within the integrated circuit device 100 based on the specific characteristics of the application currently running, and therefore improve the effectiveness of such power management within the integrated circuit device 100.

Furthermore, by implementing such adaptive power management within a hardware module the overhead on software executing on the host processor 110 and the delay associated with upper level software power management implementations may be substantially alleviated. In addition, the example solution herein described and illustrated in the accompanying drawings does not require any prior knowledge of the applications running, and is capable of autonomously adapting to whatever application is running.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. For example, in the examples illustrated in the accompanying drawings and hereinbefore described, separate activate and deactivate signals 126, 128 have been used to cause the respective client component 120 to be put into and brought out of respectively a reduced power mode. However, it will be appreciated that in some alternative examples a single signal may be used to cause the respective client component 120 to be put into and brought out of a reduced power mode, for example whereby the signal may be asserted at to cause the client component 120 to be put into a reduced power mode and de-asserted to cause the client component 120 to be brought out of the reduced power mode.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the example hereinbefore described and illustrated in the accompanying drawings, the client monitoring component 140 and power mode control component 150 have been illustrated and described as separate components. However, such components may be implemented as a single component.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A power management module comprising a client monitoring component arranged to:
  monitor idle periods for at least one client component; and
  derive at least one idle period characteristic value for the at least one client component based at least partly on the monitoring of the idle periods therefor,
  wherein the power management module further comprises a power mode control component arranged to:
   receive an indication of the at least one client component entering an idle period;

cause the at least one client component to be put into a reduced power mode upon expiry of a first period of time from receipt of the indication of the at least one client component entering an idle period; and cause the at least one client component to be brought out of the reduced power mode upon expiry of a second period of time, the second period of time starting from receipt of the indication of the at least one client component entering an idle period, wherein the second period of time is longer than the first period of time, and wherein the reduced power mode is a lower power mode than a power mode of the at least one client component during the idle period, wherein at least one of the first and second periods of time is configured based at least partly on the at least one idle period characteristic value derived by the client monitoring component for the at least one client component.

2. The power management module of claim 1, wherein the client monitoring component is arranged to measure durations of at least one of idle periods and active periods for the at least one client component, and derive the at least one idle period characteristic value for the at least one client component based at least partly on the measured durations of the at least one of idle and active periods therefor.

3. The power management module of claim 2, wherein the client monitoring component is arranged to derive at least one idle period characteristic value for the at least one client component comprising at least one from a group comprising at least one of:
   a mean idle period duration for the at least one client component;
   a median idle period duration for the at least one client component;
   a mode idle period duration for the at least one client component;
   a highest idle period duration for the at least one client component;
   a lowest idle period duration for the at least one client component;
   a mean active period duration for the at least one client component;
   a median active period duration for the at least one client component;
   a mode active period duration for the at least one client component;
   a highest active period duration for the at least one client component; and
   a lowest active period duration for the at least one client component.

4. The power management module of claim 2, wherein the client monitoring component is arranged to perform a defined number of measurements of at least one of idle periods and active periods for the at least one client component, and to derive the at least one idle period characteristic value for the at least one client component based at least partly on the defined number of measurements of at least one of idle periods and active periods for the at least one client component.

5. The power management module of claim 1, wherein the client monitoring component is arranged to derive client component specific idle period characteristic values based at least partly on the monitoring of the idle periods therefor.

6. The power management module of claim 1, wherein the power mode control component is arranged to, upon receiving an indication of the at least one client component entering an idle period;
   initialise a first timing reference arranged to expire after the first period of time from receipt of the indication of the at least one client component entering an idle period;
   cause the at least one client component to be put into a reduced power mode upon expiry of the first timing reference;
   initialise a second timing reference arranged to expire after the second period of time from receipt of the indication of the at least one client component entering an idle period; and
   cause the at least one client component to be brought out of the reduced power mode upon expiry of the first timing reference.

7. The power management module of claim 1 implemented within an integrated circuit device comprising at least one die within a single integrated circuit package.

8. A method of power management within an integrated circuit device, the method comprising:
   monitoring idle periods for at least one client component within the integrated circuit device; and
   deriving at least one idle period characteristic value for the at least one client component based at least partly on the monitoring of the idle periods therefor,
   wherein the method further comprises:
      receiving an indication of the at least one client component entering an idle period;
      causing the at least one client component to be put into a reduced power mode upon expiry of a first period of time from receipt of the indication of the at least one client component entering an idle period; and
      causing the at least one client component to be brought out of the reduced power mode upon expiry of a second period of time, the second period of time starting from receipt of the indication of the at least one client component entering an idle period, the second period of time being longer than the first period of time, and wherein the reduced power mode is a lower power mode than a power mode of the at least one client component during the idle period,
   wherein at least one of the first and second periods of time is configured based at least partly on the at least one idle period characteristic value derived by the client monitoring component for the at least one client component.

9. The power management module of claim 3, wherein the client monitoring component is arranged to perform a defined number of measurements of at least one of idle periods and active periods for the at least one client component, and to derive the at least one idle period characteristic value for the at least one client component based at least partly on the defined number of measurements of at least one of idle periods and active periods for the at least one client component.

* * * * *